United States Patent Office 3,192,168
Patented June 29, 1965

3,192,168
PALLADIUM-TIN CATALYSTS
Jean Baptiste Grenet, Bron, France, assignor to Societe des Usines Chimiques Rhone-Poulenc, Paris, France, a body corporate of France
No Drawing. Filed Jan. 29, 1960, Ser. No. 5,338
Claims priority, application France, Feb. 2, 1959, 785,544
5 Claims. (Cl. 252—473)

This invention relates to a new catalyst for the selective hydrogenation of compounds containing triple bonds. More particularly it concerns a new palladium catalyst for the hydrogenation of acetylenic bonds to ethylenic bonds, a process for the production thereof and a process for the selective hydrogenation of acetylene derivatives.

It is known to hydrogenate acetylene derivatives to ethylene derivatives with the aid of catalysts containing palladium partially deactivated by means of lead salts or bismuth salts. With such catalysts selective hydrogenation of the triple bond (i.e., involving cessation of hydrogen absorption directly the quantity necessary for the reduction of the triple bond to the double bond has been absorbed) can be effected only with acetylene derivatives having a long carbon chain. With lower acetylene derivatives, the reaction is not wholly selective and it is necessary to determine exactly the quantity of catalyst to be employed for a given weight of acetylene derivative, since any excess of catalyst produces hydrogenation of the resultant double bonds. It has been proposed to increase the selectivity of the palladium catalyst deactivated with lead salts by operating in a medium containing a substantial proportion of quinoline. This method improves the selectivity, but it is still necessary to follow carefully the progress of the hydrogenation, by titration of the double bonds, in order to stop the hydrogen absorption at the instant when all the triple bonds have been hydrogenated and before the hydrogenation of the double bonds commences.

The deactivation of palladium catalysts with the aid of zinc, mercury, cadmium and thorium salts has also been described. The catalysts deactivated in this manner have good selectivity when used with higher acetylene derivatives, but when they are used with lower acetylene derivatives the progress of the absorption of hydrogen must be followed very carefully.

It has now been found that when palladium is partially deactivated with a stannous salt, a hydrogenation catalyst is obtained which has good selectivity both for higher and lower acetylene derivatives, while the absorption of hydrogen ceases when the reduction of triple bonds to double bonds is complete.

According to a feature of the present invention therefore there is provided a selective hydrogenation catalyst comprising supported metallic palladium and a stannous salt. Suitable supports are, for example, barium carbonate, carbon black, active charcoal, and calcium carbonate. Of these calcium carbonate is preferred. Suitable stannous salts are, for example, the acetate and the halides, particularly the chloride. The atomic ratio of tin to palladium in the catalyst is preferably not less than 2 to 1.

According to a further feature of the invention there is provided a process for the preparation of a selective hydrogenation catalyst which comprises mixing an aqueous solution of a palladium salt with a support material, reducing the palladium salt to metallic palladium and treating the supported metallic palladium with an aqueous solution of a stannous salt, preferably a solution of stannous chloride in dilute hydrochloric acid. As a variant of the above process, the supported metallic palladium may be mixed with a stannous salt in the solid state and water added to the mixture thus formed.

According to a further feature of the invention there is provided a process for the selective hydrogenation of an acetylene derivative to the corresponding ethylene derivative which comprises hydrogenating the acetylene derivative in an inert organic solvent medium and in the presence of a palladium-tin catalyst as defined above. As inert organic solvents there may be used, for example, petroleum ether, methanol, ethanol and diethyl ether. An organic base such as quinoline may be added if desired.

The following examples, in which the percentages referred to are by weight, will serve to illustrate the invention.

Example I

To 5 g. of calcium carbonate suspended in water are added 5 cc. of an aqueous palladium chloride solution containing 2.5% of Pd and the suspension is then subjected to hydrogenation. The resultant precipitate is separated off and washed in the cold with distilled water. The cake obtained is dried in vacuo at 45° C. and is found to contain 2.78% of palladium. It is brought into contact with 12 cc. of a solution of 50 g. per litre of stannous chloride ($SnCl_2.2H_2O$) in 0.1 N hydrochloric acid.

When the solid has been uniformly wetted, 48 cc. of water are added. The suspension is then agitated for 10 minutes at ambient temperature and for 40 minutes on a boiling water bath. After separation, washing and drying at 40–43° C. in vacuo, the catalyst thus obtained has the following characteristics: weight 4.946 g.; Sn content 6.25%; Pd conent 2.81%; Sn/Pd ratio by weight=2.225.

Example II

Into a 50 cc. hydrogenating flask are introduced 1.52 g. of dehydrolinalol (triple bond titration 97.5–98% of theoretical), 0.3 g. of the catalyst prepared as described in Example I, 0.120 g. of quinoline and 6 cc. of petroleum ether. The flask is flushed with a current of hydrogen for 15 minutes and then connected to a cylinder containing hydrogen under a pressure of about 35 cm. of water, and the contents of the flask are agitated at ambient temperature. After one and a quarter hours the hydrogen absorption ceases automatically. It is found that 264 cc. of hydrogen have been absorbed (i.e., an excess of 4% over the theoretical allowing for corrections). The catalyst is filtered off and the filtrate is subjected to sufficient acid washes to remove the quinoline, and the solvent is then evaporated and the linalol obtained is rectified. Titration indicates the complete absence of triple bonds, while determination of the double bonds indicates their presence to the extent of 95.2% of the theoretical.

Example III

Following the procedure described in Example II but, in the preparation of the catalyst according to Example I, adding solid stannous chloride to the palladium deposited on calcium carbonate and then adding water, instead of adding stannous chloride solution directly, it has been observed that the hydrogenation stops after 2 hours, the volume of hydrogen absorbed in this instance being 252 cc.

Example IV

But-l-yn-3-ol (0.01 mol) in solution in diethyl ether is hydrogenated following the procedure described in Example II with the catalyst described in Example I. The absorption of hydrogen ceases automatically after 8½ hours and the quantity of hydrogen absorbed is found to be 242 cc. (i.e., the theoretical quantity for the hydrogenation of butynol to butenol).

Example V

Following the procedure of Example II but using 3-methyl-but-1-yn-3-ol in place of dehydrolinalol it is found that hydrogenation stops after 1¾ hours, 264 cc. of hydrogen having been absorbed.

I claim:

1. A selective hydrogenation catalyst consisting essentially of a support material impregnated with palladium and a stannous salt selected from the group consisting of stannous acetate and stannous chloride.

2. A catalyst according to claim 1 in which the stannous salt is stannous chloride.

3. A catalyst according to claim 1 in which the support material is calcium carbonate.

4. A selective hydrogenation catalyst consisting essentially of palladium impregnated with stannous chloride on a calcium carbonate support, the atomic ratio of tin to palladium being not less than 2:1.

5. A process for the preparation of a selective hydrogenation catalyst which comprises reducing a palladium salt to palladium on a support material and impregnating the supported palladium with an aqueous solution of an inorganic stannous salt.

References Cited by the Examiner

UNITED STATES PATENTS

| | | | |
|---|---|---|---|
| 1,275,405 | 8/18 | Dewar et al. | 252—472 |
| 2,450,176 | 9/48 | Zschiegner | 252—472 |
| 2,516,826 | 7/50 | Smith | 260—642 |
| 2,681,938 | 6/54 | Lindlar | 252—472 X |
| 2,733,270 | 1/56 | Fisher | 252—472 X |
| 2,802,889 | 8/57 | Frevel et al. | 260—677 |
| 2,814,599 | 11/57 | LeFrancois et al. | 242—466 |
| 2,848,502 | 8/58 | Surmatis | 260—642 X |
| 2,908,722 | 10/59 | Casey | 260—642 |
| 2,909,578 | 10/59 | Andersen et al. | 252—466 X |
| 2,927,088 | 3/60 | Michalko et al. | 252—466 |
| 2,927,141 | 3/60 | Cohn et al. | 260—677 |
| 2,989,567 | 6/61 | Leeds et al. | 260—642 X |
| 3,011,920 | 12/61 | Shipley | 252—472 X |
| 3,030,186 | 4/62 | Kreuz et al. | 252—466 X |

MAURICE A. BRINDISI, *Primary Examiner.*

CHARLES B. PARKER, JULIUS GREENWALD,
*Examiners.*